United States Patent [19]

Schürmann et al.

[11] Patent Number: 5,349,357
[45] Date of Patent: Sep. 20, 1994

[54] CIRCUIT ARRANGEMENT FOR OBTAINING A CONSTANT FIELD STRENGTH OF AN HF SIGNAL RADIATED BY A TRANSMITTING DEVICE WITH EXCHANGEABLE ANTENNA

[75] Inventors: Josef H. Schürmann, Oberhummel, Fed. Rep. of Germany; Lodewijk J. D'Hont, Zwolle, Netherlands

[73] Assignee: Texas Instruments Incorporated, Dallas, Tex.

[21] Appl. No.: 916,045

[22] Filed: Jul. 17, 1992

[30] Foreign Application Priority Data

Jul. 18, 1991 [EP] European Pat. Off. ........ 91112051.7

[51] Int. Cl.$^5$ .............................................. G01S 13/80
[52] U.S. Cl. ................................................. 342/51
[58] Field of Search ........................... 342/51, 44, 42

[56] References Cited

U.S. PATENT DOCUMENTS

| | | | |
|---|---|---|---|
| 3,772,668 | 11/1973 | Smith | 342/42 X |
| 4,121,102 | 10/1978 | Wilson | 342/44 X |
| 4,297,701 | 10/1981 | Henriques | 342/42 |
| 4,450,445 | 5/1984 | Conner, Jr. et al. | 343/7.5 |
| 4,457,746 | 10/1985 | Erickson et al. | 330/298 |
| 5,025,492 | 6/1991 | Viereck | 342/144 |

FOREIGN PATENT DOCUMENTS

| | | |
|---|---|---|
| 0365939 | 5/1990 | European Pat. Off. . |
| 0392327 | 10/1990 | European Pat. Off. . |
| 0394714 | 10/1990 | European Pat. Off. . |

*Primary Examiner*—John B. Sotomayor
*Attorney, Agent, or Firm*—Rebecca A. Mapstone; James C. Kesterson; Richard L. Donaldson

[57] ABSTRACT

A circuit arrangement is described with the aid of which a constant field strength of an HF signal radiated by a transmitting device (10) having an exchangeable antenna (12) can be achieved. Associated with the exchangeable antenna (12) is an antenna-specific component R1 from which in the operating state a control signal can be tapped after connection of the antenna (12) to the transmitting device (10). Said control signal is applied in the transmitting device (10) to an assembly (28) for influencing the transmitting power.

10 Claims, 3 Drawing Sheets

CIRCUIT ARRANGEMENT FOR OBTAINING A CONSTANT FIELD STRENGTH OF AN HF SIGNAL RADIATED BY A TRANSMITTING DEVICE WITH EXCHANGEABLE ANTENNA

FIELD OF THE INVENTION

The invention relates to a circuit arrangement for obtaining a constant field strength of an HF signal radiated by a transmitting device with exchangeable antenna.

BACKGROUND OF THE INVENTION

An example of a transponder arrangement is described which consists of an interrogation device and a responder. The interrogation device includes a transmitter which via an antenna can send to the responder an interrogation signal to which the responder reacts by transmitting a message stored therein. Said message can then be received and evaluated by the interrogation device. The responder has very small spatial dimensions and can therefore be implanted for example in animals so that said animals can then be identified by using the interrogation device in accordance with the responder contained in them. By means of an antenna the transmitter in the interrogation device generates a predetermined field strength which is necessary to reach responders lying within a predetermined distance from the interrogation device by the interrogation pulse. However, the use of field strengths as high as desired for increasing the range is not readily possible because due to official regulations in most countries certain upper limits are stipulated for the admissible field strengths depending upon the particular transmitting frequency selected. These upper limits differ from country to country so that when using the interrogation device in different countries it must be assured that the particular upper limits applicable to the field strength of the radiated HF signal are not exceeded.

Observing the field strength upper limits presents difficulties even within one country if it is intended to operate the interrogation device with different interchangeable antennas. This replacement of the antenna may be desirable for adaptation to different uses. For example, to achieve various directional patterns different antennas can be connected to the interrogation device. Thus, when changing the antenna as well it is always necessary to ensure that the admissible field strength upper limits are not exceeded with any of the antennas made available to the users.

The different upper limits of the admissible field strengths applying in various countries present problems to the manufacturer of interrogation devices when it is intended to offer one and the same interrogation device, i.e. a device having always the same transmitting section, in various countries. Supplying devices with differently set transmitting powers in accordance with the country of use would result in a considerable increase in the production and storage costs.

SUMMARY OF THE INVENTION

With the aid of the invention a circuit arrangement is thus to be provided which makes it possible to keep the field strength generated by a transmitting device by radiating an HF signal constant even with different connected antennas, and in particular below permissible maximum values.

This problem is solved according to the invention in that associated with the exchangeable antenna is an antenna-specific component from which after connection of the antenna to the transmitting device in the operating state a control signal can be tapped which in the transmitting device is applied to an assembly for influencing the transmit ting power.

According to the invention each antenna connectable to the transmitting device includes a component which is specifically associated with said antenna and which on connecting the antenna to the transmitting device ensures that the radiated transmitting power does not lead to an inadmissibly high field strength. For this purpose the transmitting device is so configured that with the aid of the control signal tappable from the component in the antenna a change of the transmitting power is made possible. Due to this configuration, the transmitting device can be used in all countries without regard to the particular official regulations applying concerning the maximum admissible field strength if it is ensured that in the particular country only those antennas which by incorporating the antenna-specific components are each allowed for said country or for a group of countries are used. In this manner, with one and the same transmitting device the transponder arrangement can be used in a great variety of countries, in which different upper limits of the field strengths apply, if the transmitting devices are in each case operated with the antennas designed specifically for the country concerned. Since the countries can be combined in groups in which the same antennas can even be used, the number of antennas to be made available for the various countries or groups of countries can be kept down to an acceptable level.

BRIEF DESCRIPTION OF THE DRAWINGS

Examples of embodiment of the invention will now be explained in detail with the aid of the drawings, wherein.

DETAILED DESCRIPTION OF THE PREFERRED EMBODIMENTS

Figure 1:
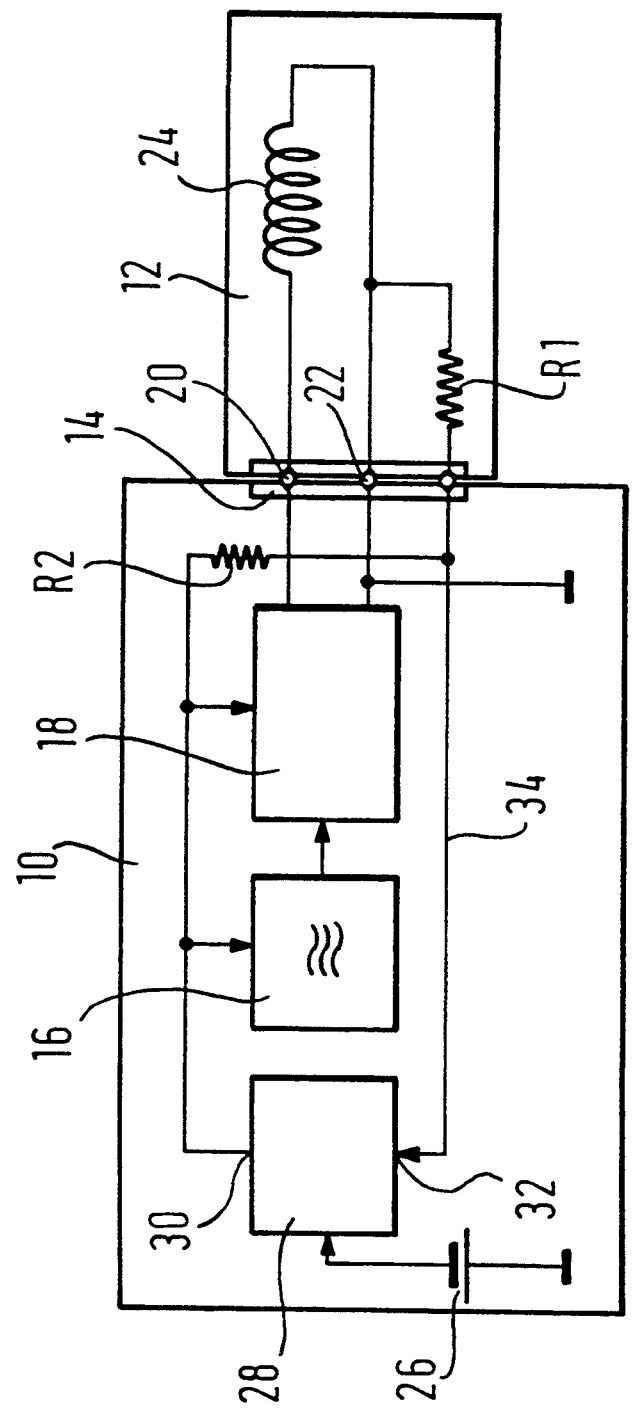
FIG. 1 shows a schematic circuit diagram of a first embodiment of the circuit arrangement according to the invention.

In FIG. 1 a transmitting device 10 is illustrated which is coupled to a replaceable antenna 12 via a schematically illustrated plug connection 14.

The transmitting device 10 includes an HF oscillator 16 which generates an HF signal to be transmitted. The HF signal generated by the HF oscillator 16 is amplified in an end stage 18 and supplied via the terminals, 20, 22 to the antenna coil 24.

The supply voltage of the transmitting device 10 is furnished by a battery 26 and regulated via a voltage regulating circuit 28. The regulated voltage furnished by the voltage regulating circuit 28.at the output 30 is supplied to the HF oscillator 16 and the end stage 18. The voltage regulating circuit 28 is an integrated circuit of the type LM 317 made and marketed by the company Texas Instruments. This circuit is described in the "Data Book", vol. 3, 1989, pages 2-8 to 2-15, which relates to linear circuits and is published by Texas Instruments. The voltage furnished by the voltage regulating circuit 28 at the output 30 can be set to a desired value with the aid of a DC voltage applied to its input 32.

As is apparent in FIG. 1, the antenna 12 includes a resistor R1 which together with a resistor R2 in the transmitting device 10 forms a voltage divider lying between the supply voltage furnished by the voltage regulating circuit 28 and ground. The voltage tapped from the connection point of the two resistors R1 and R2 is supplied via a line 34 as control signal to the input 32 of the voltage regulating circuit 28. The voltage value at the line 34 thus depends clearly on the value of the resistor R1 so that by suitable choice of the resistor R1 the supply voltage furnished by the voltage regulating circuit 28 at the output 30 can be set to a desired value.

With the circuit arrangement illustrated in FIG. 1 it is possible by selecting the appropriate antenna, in which in each case a specific resistor R1 is incorporated to generate a specific field strength of the radiated HF signal. In this case this influencing of the field strength is effected by changing the supply voltage which is furnished by the voltage regulating circuit 28 and also supplied to the end stage 18, which in known manner on application of a lower supply voltage also furnishes a correspondingly lower output power.

If another antenna 12 is coupled to the transmitting device 1 and due to the antenna coil 24 contained therein for a given transmitting power could generate a higher field strength than admissible in the particular area of use, said higher field strength is prevented in that in said antenna a resistor R1 is incorporated which together with the resistor R2 generates a control signal for the voltage regulating circuit 28 such that the supply voltage is correspondingly reduced and the output power of the end stage 18 accordingly also diminished. Thus, even when changing the antenna 12 it is reliably prevented that an inadmissibly high field strength can be generated.

Figure 2:
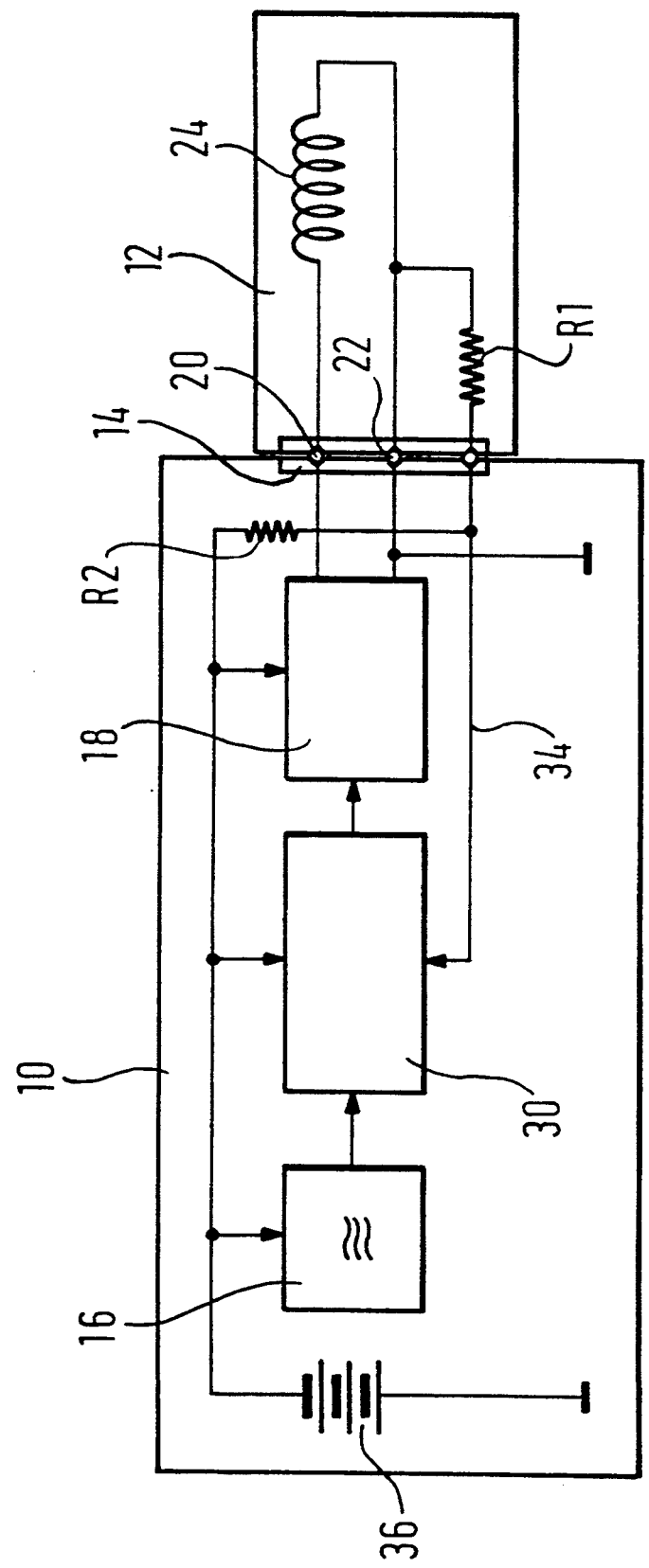
FIG. 2 shows a schematic circuit diagram of a second embodiment of the circuit arrangement according to the invention.

In FIG. 2 a further embodiment of the circuit arrangement of FIG. 1 is illustrated in which it is likewise possible to prevent an inadmissibly high field strength being generated. In FIG. 2 the same reference numerals as in FIG. 1 are used for the same components. In the transmitting device 10 of FIG. 2 the supply voltage is generated with the aid of a battery 36. A voltage regulating circuit is not used. As in the embodiment of FIG. 1 the HF generator 16 generates the HF signal transmitted after amplification in the end stage 18. The HF signal from the HF generator 16 is supplied to a pulse duration modulator 50 which with the aid of a control signal supplied thereto via the line 34 and tapped from the voltage divider comprising the resistors R1 and R2 can be controlled in such a manner that it supplies to the end stage 18 pulses having a duration dependent on the value of the control signal. By changing the pulse duration the power emitted by the end stage 18 can be influenced.

This pulse duration modulator 38 is an integrated circuit of the type TL594 manufactured and distributed by the company Texas Instruments. This circuit is described in the "Data Book", vol. 3, 1989, of the company Texas Instruments on pages 2-143 to 2-151, which relates to linear circuits.

As in the embodiment of FIG. 1 the resistor R1 assigned to the particular antenna 12 used effects an influencing of the control signal supplied to the pulse duration modulator 38 in such a manner that irrespective of the nature of the antenna used the same maximum field strength is always generated by correspondingly increasing or decreasing the duration of the pulses supplied to the end stage 18 and radiated by the antenna 12.

Figure 3:
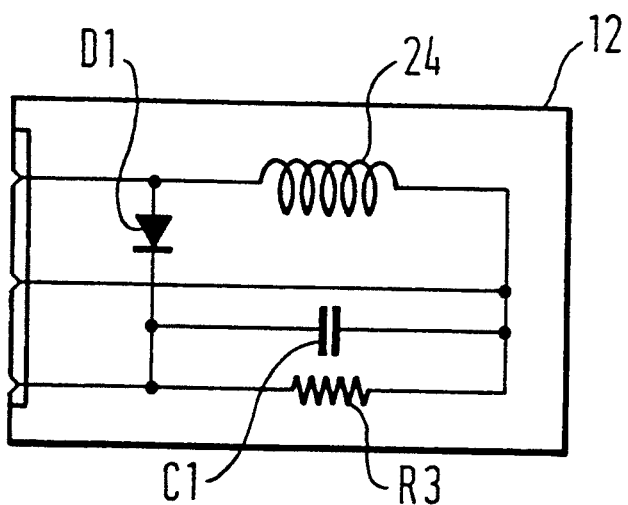
FIGS. 3 to 5 show examples of embodiment of the components disposed in the antenna for generating the control signal.

Instead of the resistor R1, it is possible to use in the antenna 12 a component for generating the control signal which depends directly on the voltage applied to the antenna or on the current flowing through the antenna. In FIG. 3 an embodiment is illustrated in which the control signal is generated in dependence upon the voltage applied to the antenna. As can be seen from FIG. 3 the voltage applied to the antenna coil 24 is rectified with the aid of a diode D1 and smoothed by means of an RC member consisting of the capacitor C1 and the resistor R3. The rectified voltage is then supplied via the line 34 either to the voltage regulator 28 of the embodiment of FIG. 1 or the pulse generation modulator 38 in the embodiment of FIG. 2.

The embodiment of the antenna 12 of FIG. 3 has the advantage that the field strength generated is set directly in dependence upon the voltage applied to the antenna, resulting in a control circuit which ensures that the field strength is kept constant. Thus, if for example due to soiled contacts between the transmitting device 10 and the antenna 12 a lower voltage arises at the antenna coil 24, this can be compensated through the control action by taking corresponding account thereof in the transmitting device by increasing the output power so that the desired constant field strength is again achieved. Power losses are also compensated in this manner.

Figure 4:
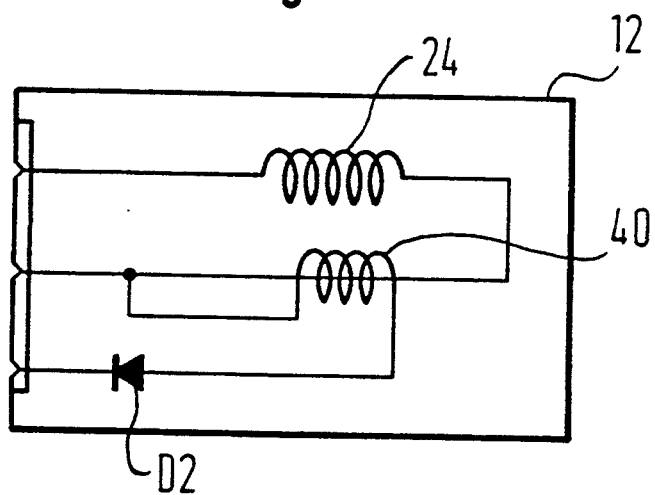
Figure 5:
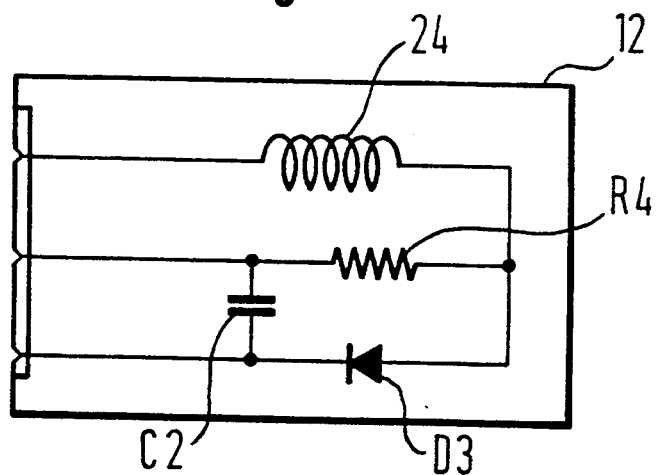

In the embodiments of the antenna of FIG. 4 and FIG. 5 the control signal is generated in dependence upon the current flowing through the antenna coil 24. In FIG. 4, for this purpose a current sensor is used in the form of a winding 40 which is inductively coupled to the antenna coil 24. The voltage induced in the winding 40 is rectified in a diode D2 and supplied as control signal via the line 34 either to the voltage regulating circuit 28 or to the pulse duration modulator 38.

In the embodiment of FIG. 5 a resistor R4 is incorporated into the current path of the current antenna winding 24 and is thus traversed by the current flowing through the antenna winding 24. After rectification by means of the diode D3 and smoothing by means of the capacitor C2 the voltage drop at said resistor R4 is applied as control signal via the line 34 either to the voltage regulating circuit 28 or to the pulse duration modulator 38.

In the embodiments of FIGS. 4 and 5 as well a genuine control effect is achieved and this means that the field strength generated can be kept constant irrespective of any possible deterioration of the contact connection between the transmitting device 10 and the antenna 12. The magnitude of the field strength can be set by selecting the resistor R3 in the embodiment of FIG. 3, by selecting the number of turns of the winding 40 in the embodiment of FIG. 4 or by the magnitude of the resistor R4 in the embodiment of FIG. 5. In the embodiment of FIG. 3 it is also possible to influence the value of the voltage applied as control signal by an ohmic or capacitive voltage divider so that the magnitude of the field strength can thus also be influenced.

We claim:

1. A circuit arrangement for obtaining constant field strength of an HF signal radiated by an antenna of a transmitting device which has exchangeable antennas and an assembly within comprising:
- a transmitting device for generating and transmitting a constant field strength HF signal;
- at least one exchangeable, disconnectable antenna, capable of being connected to and disconnected from said transmitting device for transmitting said constant field strength signal, comprising,
- an antenna-specific component, distinct for each exchangeable antenna, for increasing, decreasing or maintaining the transmitting power of said transmitting device via transmission of a control signal from said antenna-specific component to an assembly disposed within said transmitting device.

2. Circuit arrangement according to claim 1, wherein said transmitting device has a supply voltage and said component is an ohmic resistor which forms, with an ohmic resistor disposed within the transmitting device, a voltage divider connected to the supply voltage of the transmitting device and that said control signal is part of the supply voltage.

3. Circuit arrangement according to claim 1, wherein the component is a voltage sensor which generates the control signal in dependence upon the voltage present at the antenna.

4. A circuit arrangement according to claim 1, wherein said antenna-specific component is a voltage sensor which senses a voltage present at said exchangeable antenna subsequent to said generation of said HF signals and generates a control signal dependent upon said voltage.

5. Circuit arrangement according to claim 4, wherein the voltage sensor comprises a rectifier circuit which rectifies the HF signal present at the antenna and generates the control signal in the form of a rectified voltage.

6. Circuit arrangement according to claim 1, wherein the component is a current sensor which senses a current flowing through said exchangeable antenna upon generation of said HF signals and generates the control signal in dependence upon said current flowing through the antenna.

7. Circuit arrangement according to claim 5, wherein the current sensor includes a coil coupled inductively to the antenna.

8. Circuit arrangement according to claim 1, wherein the assembly for increasing, decreasing or maintaining the transmitting power is a voltage regulator for changing the amplitude of the HF signal emitted by the transmitting device, said regulator adjusting the supply voltage of the transmitting device in dependence upon the control signal.

9. Circuit arrangement according to claim 1, wherein the transmitting device emits the HF signal in the form of pulses and that the assembly for influencing the transmitting power is a pulse duration modulator which adjusts the duration of the pulses emitted by the transmitting device in dependence upon the control signal.

10. A method for obtaining a constant field strength of an HF signal radiated by an antenna of a transmitting device which has exchangeable antennas comprising the steps of:
- generating HF signals to be transmitted;
- amplifying said HF signals;
- supplying said amplified HF signals to an exchangeable antenna, which has an antenna-specific component, in the form of a voltage;
- detecting said supplied voltage and transmitting a control signal to said transmitting device in response to said supplied voltage;
- modifying said supplied voltage in response to said control signal transmitted from said antenna-specific component;
- transmitting said constant field strength signal.

* * * * *